US006666432B2

(12) United States Patent
Ishigaki et al.

(10) Patent No.: US 6,666,432 B2
(45) Date of Patent: Dec. 23, 2003

(54) IDLE SPEED CONTROL VALVE

(75) Inventors: Satoshi Ishigaki, Kariya (JP); Shigeru Hasegawa, Nagoya (JP); Tetsuo Hariu, Kariya (JP)

(73) Assignee: Denso Corporation, Kariya (JP)

( * ) Notice: Subject to any disclaimer, the term of this patent is extended or adjusted under 35 U.S.C. 154(b) by 133 days.

(21) Appl. No.: 10/073,872

(22) Filed: Feb. 14, 2002

(65) Prior Publication Data

US 2002/0113221 A1 Aug. 22, 2002

(30) Foreign Application Priority Data

Feb. 16, 2001 (JP) ....................................... 2001-040245
Nov. 9, 2001 (JP) ....................................... 2001-345027

(51) Int. Cl.[7] ................................................ F16K 31/02
(52) U.S. Cl. .................................................. 251/129.18
(58) Field of Search ........................ 251/129.15, 129.18, 251/285; 123/339.1, 339.14, 339.27; 239/533.4, 102.2; 277/316, 591, 596

(56) References Cited

U.S. PATENT DOCUMENTS 4,268,041 A * 5/1981 Sovish et al. ............... 277/314
4,630,799 A * 12/1986 Nolan et al. ........... 251/129.18
5,312,050 A * 5/1994 Schumann et al. ...... 239/585.1
5,586,747 A * 12/1996 Bennardo et al. ...... 251/129.18
5,992,822 A * 11/1999 Nakao et al. .......... 251/129.15
6,102,407 A * 8/2000 Moriya et al. .............. 277/316

* cited by examiner

*Primary Examiner*—Gene Mancene
*Assistant Examiner*—Patrick Buechner
(74) *Attorney, Agent, or Firm*—Nixon & Vanderhye P.C.

(57) ABSTRACT

In an idle speed control valve, an adjusting screw is inserted into a hole of a valve body and passes through a center of a coil provided in the valve body. The adjusting screw has a ring-shaped flexible projection on its outer periphery between a head portion and a threaded portion thereof to prevent a sealing material from entering. An outer diameter of the projection is equal to or slightly larger than an inner diameter of the hole. Therefore, when the adjusting screw is inserted into the hole, a peak of the projection contacts an inner wall of the hole. The projection may be integrally molded with the adjusting screw. A ring-shaped projection may be provided on a thin wall portion of the adjusting screw.

7 Claims, 6 Drawing Sheets

IDLE SPEED CONTROL VALVE

CROSS REFERENCE TO RELATED APPLICATION

This application relates to and incorporates herein by reference Japanese Patent Application No. 2001-40245 filed on Feb. 16, 2001 and Japanese Patent Application No. 2001-345027 filed on Nov. 9, 2001.

BACKGROUND OF THE INVENTION

1. Field of the Invention

The present invention relates to an idle speed control valve (ISCV) for controlling an air amount supplied to combustion chambers in an internal combustion engine. More particularly, the present invention relates to an idle speed control valve in which an adjusting screw including a stator core is sealed with a sealing material.

2. Description of Related Art

In general, in an internal combustion engine for a vehicle, a bypass pipe separate from an actual air intake pipe is provided to bypass a throttle valve. An idle speed control valve is provided in the bypass pipe to control an amount of fluid such as air flowing in the bypass pipe.

In a general idle speed control valve shown in FIG. 5, an adjusting screw 120 is inserted in a hole 115 provided in a valve body 111 and passes through a center of windings 130. As shown in FIG. 6, the adjusting screw 120 has a threaded portion 122 on its outer peripheral surface to be threaded with an inner wall of the hole 115. Adhesive is applied to the threaded portion 122 beforehand, so that the adjusting screw 120 fixes on the inner wall of the hole 115 at a desired position.

More specifically, first, an adjusting screw 120 in which the adhesive is not applied is temporary fitted in the hole 115 to adjust a spring for biasing a movable core 141 so that a movement area becomes a predetermined crossing area. Next, adjusting screw 120 is removed from the hole 115 and replaced with adjusting screw 120 with adhesive applied onto the threaded portion 122. Then, the adjusting screw 120 is finally adjusted and fitted at a predetermined position. Next, a sealing material 150 such as silicon is applied around a head portion 121 of the adjusting screw 120 to improve air-tightness. The sealing material 150 passes between the head portion 121 and the inner wall of the hole 115 and enters the inside of the hole 115. In this case, since the threaded portion 122 is bonded with the adhesive, the sealing material 150 stops at the threaded portion 122. (Not shown)

Since a replacement of the adjusting screw 120 is required, mounting and assembly time increase and workability is worsened. Thus, if the adjusting screw 120 in which the adhesive is not applied to the threaded portion 122 is used without pre-adjustment and adjusted to the final position, the sealing material 150 applied around the head portion 121 enters deeper inside the control valve 110 beyond the threaded portion 122. For example, when this sealing material 150 is hardened around a movable core 141, operation of the movable core 141 is interrupted, and as a result, a valve 145 will not operate.

In order to prevent entering of the sealing material 150 around the movable core 141 in the idle speed control valve 110, a rigid barricade portion may be provided on the outer periphery of the adjusting screw 120. However, when the barricade portion is press-fitted on the adjusting screw 120 foreign material accumulates and is likely to enter the idle speed control valve 110. Further, the adjusting screw having the barricade portion requires more torque to be inserted into the hole 115 when compared to that of the adjusting screw 120 without the barricade portion. Therefore, the inner wall defining the hole 115, and the adjusting screw 120, are likely to be damaged.

Accordingly, in a case where the adhesive is not applied to the threaded portion, the adjusting screw is required to be inserted without damage and also, the sealing material must be restricted from entering the idle speed control valve beyond the threaded portion.

SUMMARY OF THE INVENTION

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

According to one embodiment of the present invention, an adjusting screw has a ring-shaped flexible projection on the outer peripheral surface thereof between a threaded portion and a head portion. The flexible projection projects from the outer peripheral surface of the adjusting screw in a radial direction. A width or depth of the flexible projection in a radial direction is substantially equal to a distance between the outer peripheral surface of the adjusting screw and an inner wall of a hole provided in an idle speed control valve body. Therefore, a peak of the flexible projection contacts the inner wall of the hole when the adjusting screw is inserted into the hole.

Accordingly, a sealing material, which is applied around a head portion of the adjusting screw for sealing between the outer peripheral surface of the adjusting screw and the inner wall of the hole, is prevented from entering inside of the idle speed control valve beyond the flexible projection. The width of the flexible projection in the radial direction can be greater than the distance between the outer peripheral surface of the adjusting screw and the inner wall. In this case, the peak of the flexible projection is bent backward (opposite to the direction of insertion) when the adjusting screw is inserted into the hole. Therefore, the entering of the sealing material is effectively prevented at the flexible projection.

According to another embodiment of the present invention, the adjusting screw has a thin wall portion on which a ring-shaped projection is provided between the threaded portion and the head portion. A width of the projection in the radial direction is greater than a distance between the outer peripheral surface of the thin wall portion and the inner wall of the hole in the idle speed control valve body. Therefore, when the adjusting screw is inserted into the hole, a peak of the projection contacts the inner wall and the thin wall portion having the projection is deformed toward an axial line of the adjusting screw. Accordingly, the sealing material is prevented from entering the inside of the idle speed control valve beyond the projection. Further, a threading torque of the adjusting screw is reduced.

Further areas of applicability of the present invention will become apparent from the detailed description provided hereinafter. It should be understood that the detailed description and specific examples, while indicating the preferred embodiment of the invention, are intended for the purpose of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF PREFERRED EMBODIMENTS

The following description of the preferred embodiments is merely exemplary in nature and is in no way intended to limit the invention, its application, or uses.

First Embodiment

Figure 1:
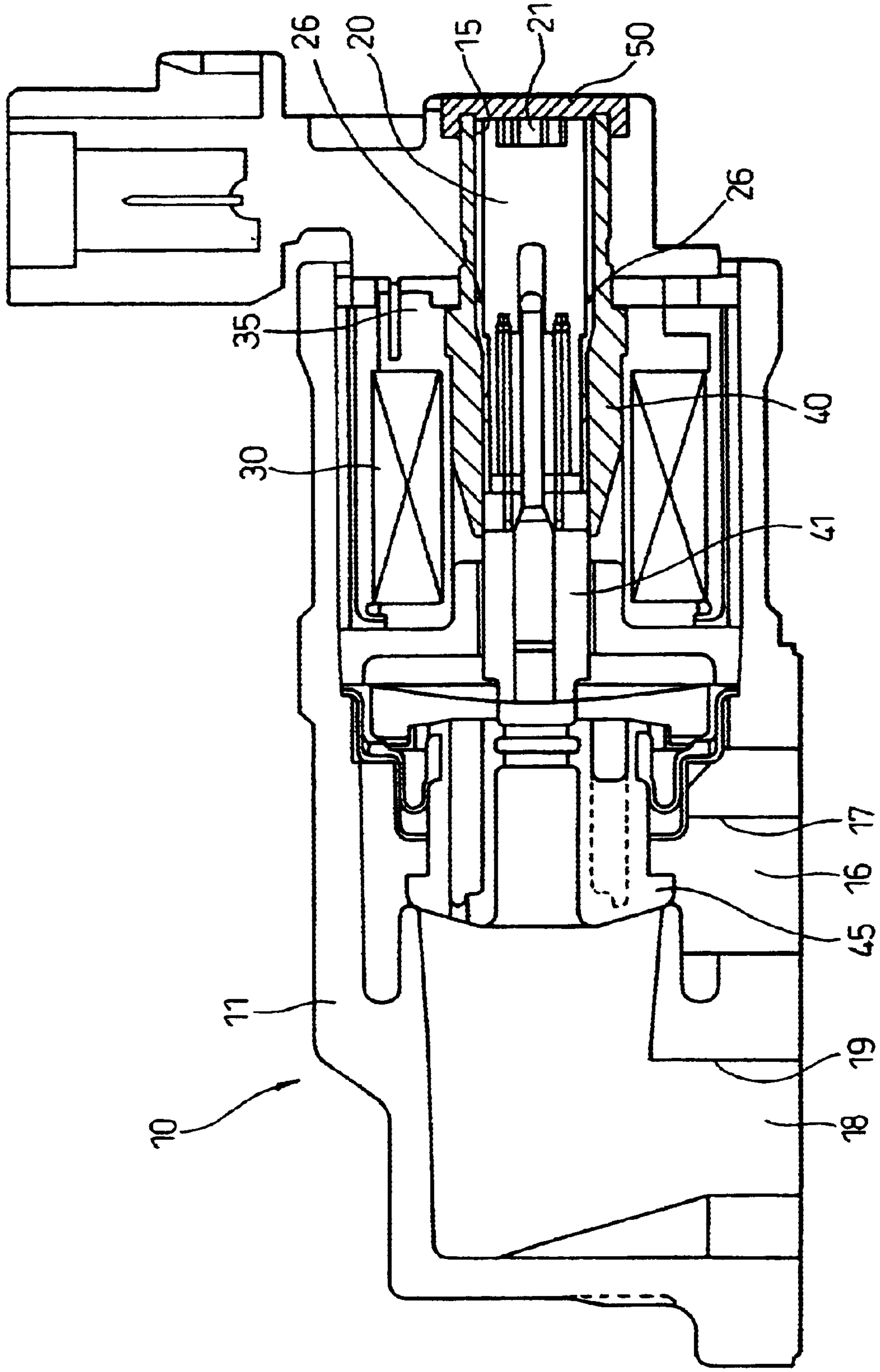
FIG. 1 is a cross-sectional view of an idle speed control valve in a longitudinal direction according to a first embodiment of the present invention.

Referring to FIG. 1, in an idle speed control valve 10, a valve body 11 has an inlet passage 19 including an inlet port 18, an outlet passage 17 including an outlet port 16, and a cylindrical-shaped hole 15. Further, the idle speed control valve 10 has an adjusting screw 20 including a stator core 40, a movable core 41 and a valve 45. In the valve body 11, a bobbin 35 and windings 30, wound around the bobbin 35, are arranged such that the adjusting screw 20 is inserted in the cylindrical-shaped hole 15 of the valve body 11 and passes through a center of the windings 30, as shown in FIG. 1. When the windings 30 are energized, the movable core 41 moves toward the stator core 40. With this movement, the valve 45 is opened, so that the inlet passage 19 is communicated to the outlet passage 17. Accordingly, when fluid such as air, that has entered from the inlet port 18 discharges from the outlet port 16, a discharging amount of the fluid is adjusted with the valve 45.

Figure 2:
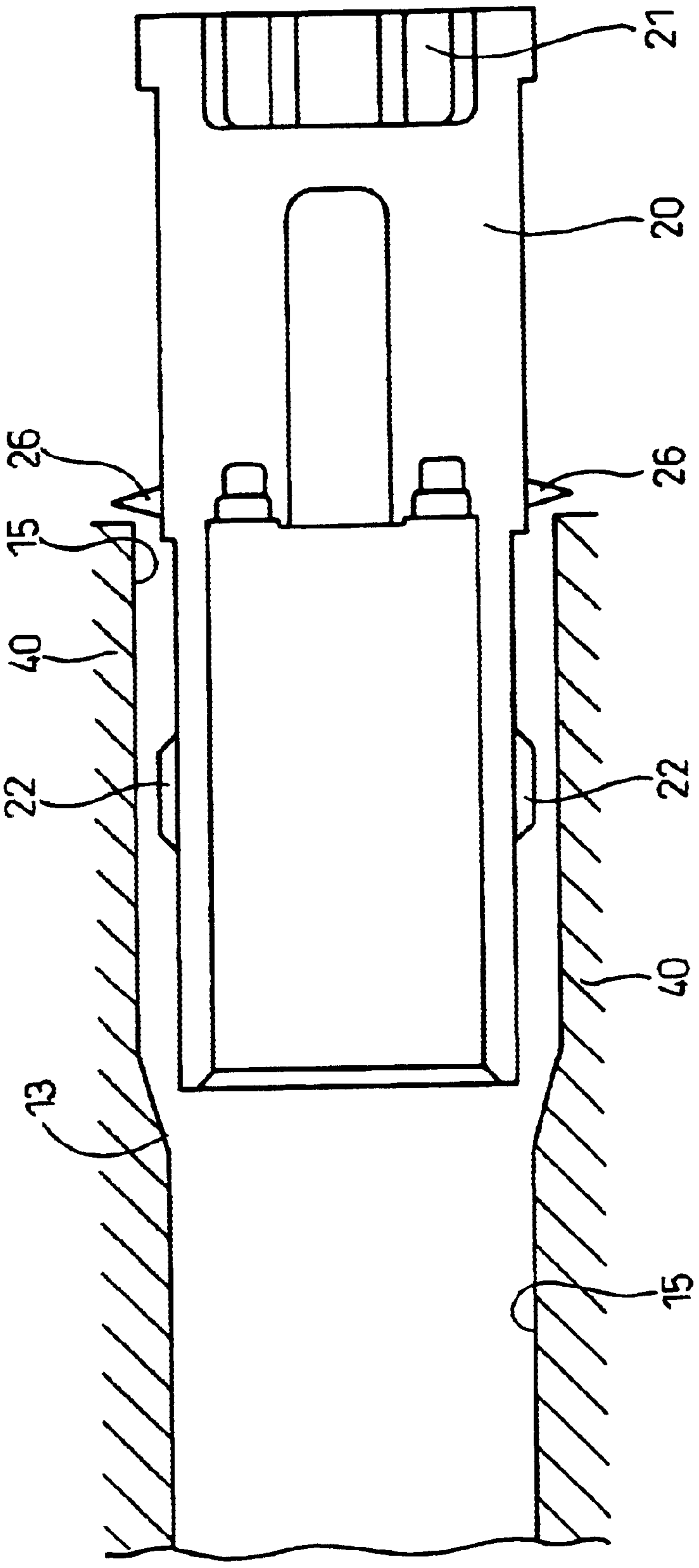
FIG. 2 is an enlarged, partial cross-sectional view of an adjusting screw before it is inserted into a hole according to a first embodiment of the present invention.
Figure 3:
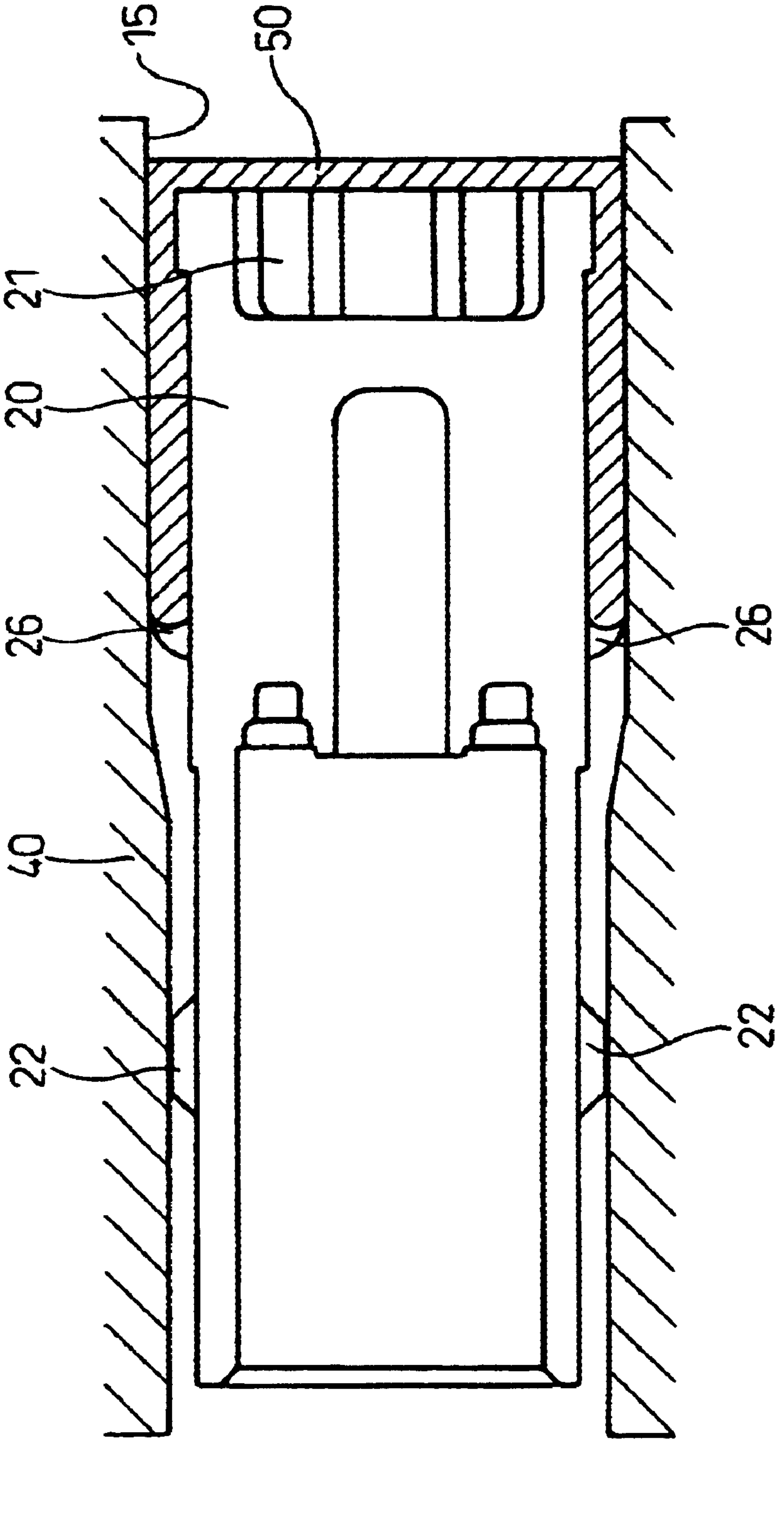
FIG. 3 is an enlarged, partial cross-sectional view of an adjusting screw when it is inserted in a hole according to the first embodiment.

The adjusting screw 20 is inserted into the cylindrical-shaped hole 15 as shown in FIGS. 2 and 3. A step 13 is provided on the inner wall defining the hole 15 of the valve body 11, so that an inner diameter of the hole 15 decreases at a left side of the step 13 in FIGS. 2 and 3. The adjusting screw 20 has a head portion 21 and a threaded portion 22. The adjusting screw 20 is inserted into the hole 15 and tightened on the inner peripheral wall of the hole 15 with the threaded portion 22.

The adjusting screw 20 is, for example, made of rubber and plastic such as polybutylene terephthalate. A ring-shaped flexible projection 26 is provided on the outer peripheral surface of the adjusting screw 20 between the head portion 21 and the threaded portion 22. The flexible projection 26 projects from the outer peripheral surface of the adjusting screw 20 in a radially outward direction. For example, the flexible projection 26 may be provided such that a rubber ring or plastic ring is fixed by burning or melting the outer peripheral surface of the adjusting screw 20. Alternatively, the flexible projection 26 may be integrally molded with the adjusting screw 20. In the latter case, a process forming the projection 26 on the screw 20 is eliminated and overall manufacturing costs may be reduced. Preferably, the flexible projection 26 is triangular-shaped in cross section, as shown in FIG. 2. When the adjusting screw 20 is inserted into the hole 15, the flexible projection 26 is pressed against the inner wall defining the hole 15, and readily bent as shown in FIG. 3.

When the adjusting screw 20 is arranged on the same axial line as that of the cylindrical hole 15, a width of the projection 26 from the outer peripheral surface of the adjusting screw 20 in the radial direction is equal to or slightly greater than a distance between the inner wall of the hole 15 and the outer peripheral surface of the adjusting screw 20. That is, the outer diameter of the ring-shaped flexible projection 26 is larger than the inner diameter of the hole 15. Therefore, when the adjusting screw 20 is inserted into the hole 15, the peak (outside diameter) of the projection 26 contacts the inner wall of the hole 15 and bends (to right side in FIG. 3) while in contact with the inner wall of the hole 15. In this way, since the projection 26 is flexibly bent, a torque for inserting the adjusting screw 20 into the hole 15 is reduced as much as possible. Accordingly, it is possible to reduce damage to the inner wall of the hole 15 and the adjusting screw 20 during insertion of the adjusting screw 20.

After the insertion of the adjusting screw 20 with projection 26, a sealing material 50, such as silicon, is applied around the head portion 21 of the adjusting screw 20. The sealing material 50 passes between the adjusting screw 20 and the inner wall of the hole 15 and enters the hole 15. At this time, the projection 26 functions as a seal, so the sealing material 50 stops at the projection 26. Thus, the sealing material 50 is prevented from further entering the inside of the hole 15, that is, beyond the seal 26 or the threaded portion 22. In this fashion, the operation of the movable core 41 and the valve 45 are not interrupted. In the case that the peak of the projection 26 is bent opposite to the direction of adjusting screw 20 insertion, the sealing material 50 is effectively prevented from further entering the hole 15.

Second Embodiment

Figure 4A:
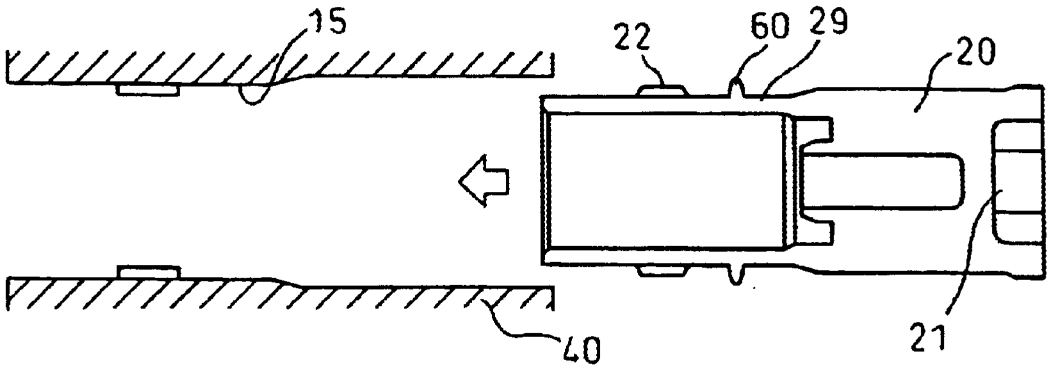
FIG. 4A is an enlarged, partial cross-sectional view of an adjusting screw for explaining insertion of the adjusting screw, according to a second embodiment of the present invention.
Figure 4B:
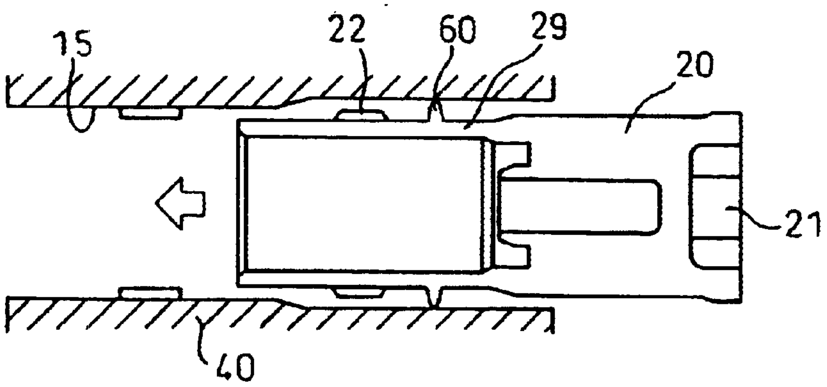
FIG. 4B is an enlarged, partial cross-sectional view of an adjusting screw for explaining insertion of the adjusting screw, according to a second embodiment of the present invention.
Figure 4C:
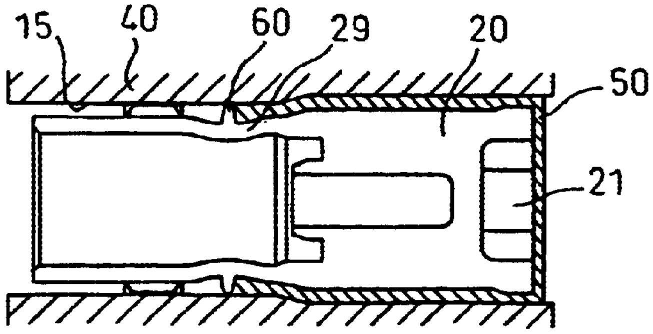
FIG. 4C is an enlarged, partial cross-sectional view of an adjusting screw for explaining insertion of the adjusting screw, according to a second embodiment of the present invention.
Figure 5:
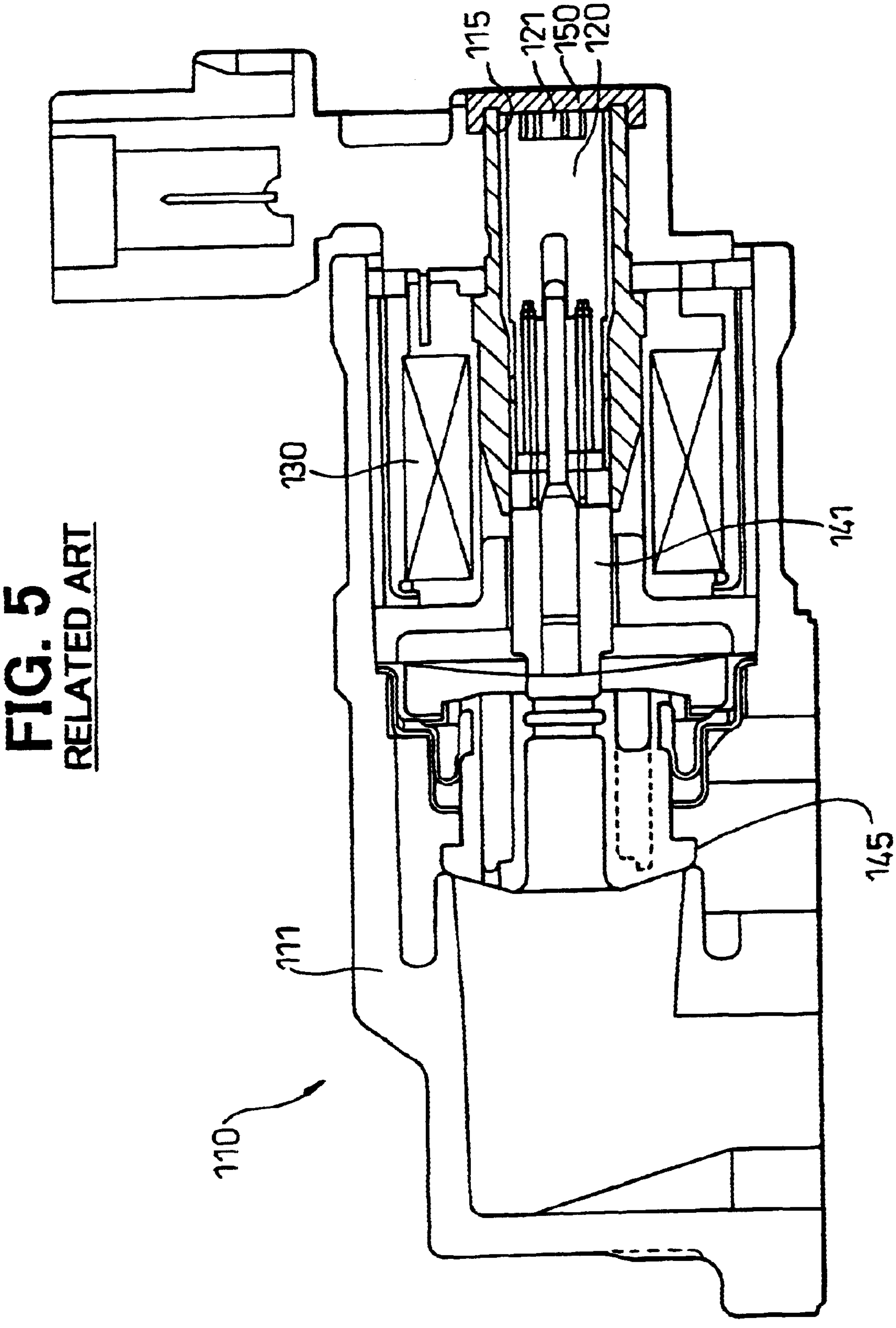
FIG. 5 RELATED ART
FIG. 5 is a related art, cross-sectional view of an idle speed control valve.
Figure 6:
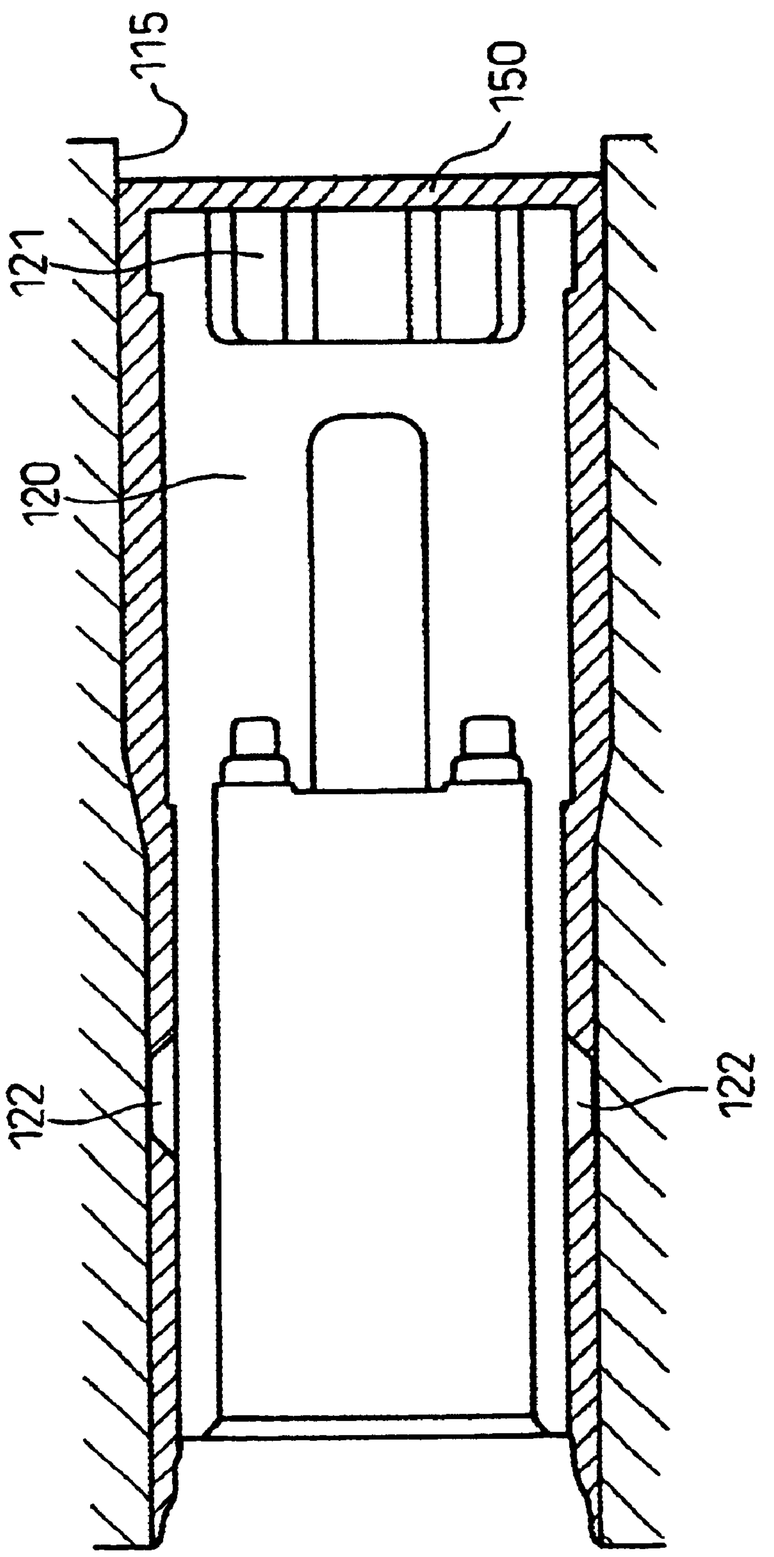
FIG. 6 RELATED ART
FIG. 6 is a related art, enlarged, partial cross-sectional view of an idle speed control valve when it is inserted in a hole.

As shown in FIGS. 4A to 4C, the adjusting screw 20 has a thin wall portion 29 around the inserting direction. In the second embodiment, a ring-shaped projection 60 is provided on the thin wall portion 29 and between the head portion 21 and the threaded portion 22. The projection 60 projects from the outer peripheral surface of the thin wall portion 29 in a radially outward direction. Also in the second embodiment, the adjusting screw 20 is, for example, made of rubber and plastic such as polybutylele terephthalate. The projection 60 may be made of a material harder than that of the adjusting screw 20. A width of the projection 60 in the radial direction is greater than a distance between the outer peripheral surface of the thin wall portion 29 of the adjusting screw 20 and the inner wall defining the hole 15. That is, the outer diameter of the projection 60 is larger than the inner diameter of the hole 15, even at the narrowest portion beyond the step 13.

As shown in FIGS. 4A and 4B, when the projection 60 passes the step 13 during the insertion, since the inner diameter of the hole 15 is smaller than the outer diameter of the projection 60 of the adjusting screw 20, the thin wall portion 29 is deformed toward the axial line of the adjusting screw 20. At this time, the projection 60 is not generally deformed. Similar to the first embodiment, the threaded portion 22 is then threaded on a threaded portion of the valve body 11 in the hole 15, so the adjusting screw 20 may be tightened. Then, the sealing material 50, such as silicon, is applied into the hole 15 as seen in FIG. 4C. The sealing material 50 passes between the inner wall of the hole 15 and the head portion 21 and enters the hole 15. Also in this case, since the projection 60 functions as a seal, the sealing material 50 stops at the projection 60. Since, the sealing material 50 does not enter the inside of the hole 15 beyond the projection 60, the operation of the movable core 41 and the valve 45 are not interrupted. Further, since the thin wall portion 29 is deformed, a threading torque of the adjusting screw 20 is reduced. Therefore, the adjusting screw 20 is fitted to the valve body 11 without requiring additional torque. Additionally, in the embodiments presented thus far, a resistant force acts on the projections 26 and 60, and as a result, frictional resistance occurs between the inner wall of the hole 15 and the projections 26 and 60. This ensures that a torque is required to loosen the adjusting screw 20. Alternatively, the projections 26 and 60 can be provided on the inner wall of the hole 15, instead of on the adjusting screw 20. Further, the projections 26 and 60 may be circular or rectangular in cross section, instead of triangular, for example.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An idle speed control valve comprising:

a valve body defining an inlet passage including an inlet port, an outlet passage including an outlet port, and a hole;

windings provided in the valve body;

an adjusting screw inserted in the hole which passes through a center of the windings and a stator core, the adjusting screw having a threaded portion on an outer peripheral surface thereof to be tightened to the valve body;

a movable core provided in the valve body and moved toward the stator core when the coil is energized; and a valve that opens with movement of the movable core to fluidly communicate with the inlet passage and the outlet passage, wherein the adjusting screw has a flexible projection on an outer peripheral surface thereof between the threaded portion and a head portion of the adjusting screw, the flexible projection projecting from the outer peripheral surface in a radially outward direction between an inner wall defining the hole and the outer peripheral surface of the adjusting screw; and wherein a peak of the flexible projection contacts the inner wall of the hole when the adjusting screw is inserted in the hole.

2. An idle speed control valve according to claim 1, wherein the flexible projection projects from the outer peripheral surface in a radially outward direction longer than a distance between the inner wall defining the hole and the outer peripheral surface of the adjusting screw; and wherein a peak of the flexible projection contacts the inner wall of the hole and bends in a direction opposite to a direction of screw insertion when the screw is inserted in the hole.

3. The idle speed control valve according to claim 1, wherein the flexible projection is integrally molded with the adjusting screw and projects from the outer peripheral surface of the adjusting screw in the radially outward direction at a length equal to a distance between the inner wall defining the hole and the outer peripheral surface of the adjusting screw; and wherein a peak of the flexible projection contacts the inner wall of the hole and bends in a direction opposite to a direction of screw insertion when the screw is inserted in the hole.

4. The idle speed control valve according to claim 1, wherein the flexible projection is integrally molded with the adjusting screw and projects from the outer peripheral surface of the adjusting screw in the radially outward direction longer than a distance between the inner wall surface defining the hole and the outer peripheral surface of the adjusting screw, and wherein a peak of the flexible projection contacts the inner wall of the hole and bends in a direction opposite to a direction of screw insertion when the screw is inserted in the hole.

5. The idle speed control valve according to claim 1, wherein the flexible projection, integrally molded with the adjusting screw, has a triangular-shape in cross section and projects from the outer peripheral surface of the adjusting screw in the radially outward direction at a length equal to a distance between the inner wall defining the hole and the outer peripheral surface of the adjusting screw; and wherein a peak of the flexible projection contacts the inner wall of the hole when the adjusting screw is inserted in the hole.

6. The idle speed control valve according to claim 1, wherein the flexible projection is integrally molded with the adjusting screw, having a triangular-shape in cross section, and projects from the outer peripheral surface of the adjusting screw in the radially outward direction longer than a distance between the inner wall defining the hole and the outer peripheral surface of the adjusting screw; and wherein a peak of the flexible projection contacts the inner wall of the hole and bends in al direction opposite to a direction of screw insertion when the screw is inserted in the hole.

7. The idle speed control valve according to claim 1, wherein the flexible projection is provided on the outer peripheral surface of a thin wall portion of the adjusting screw between the threaded portion and the head portion, the projection projecting from the outer peripheral surface of the adjusting screw in a radially outward direction longer than a distance between the outer peripheral surface of the adjusting screw and the inner wall defining the hole; and wherein a peak of the projection contacts the inner wall of the hole and the thin wall portion having the projection deforms toward an axial line of the adjusting screw.

* * * * *